Aug. 9, 1960  N. W. DENSMORE  2,948,520
AUGER BORING MACHINE FOR MINING COAL
Filed Sept. 7, 1955  3 Sheets-Sheet 1

INVENTOR:
NEAL W. DENSMORE
BY Charles F. Osgood,
ATTORNEY

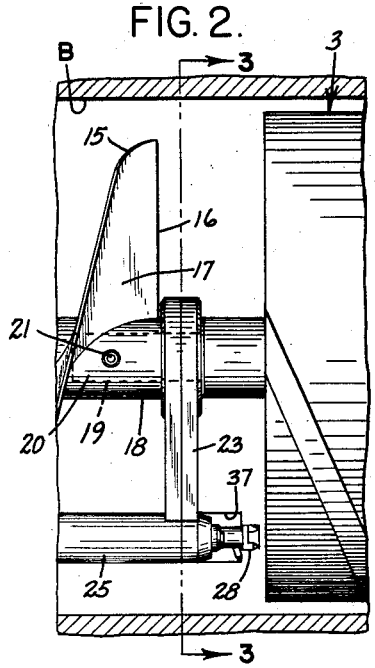
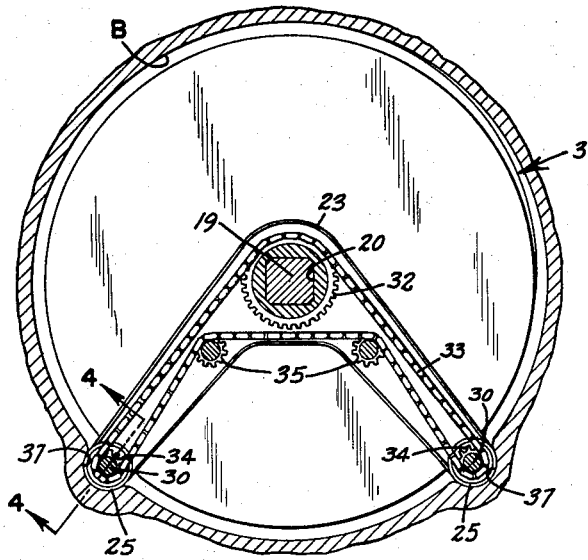
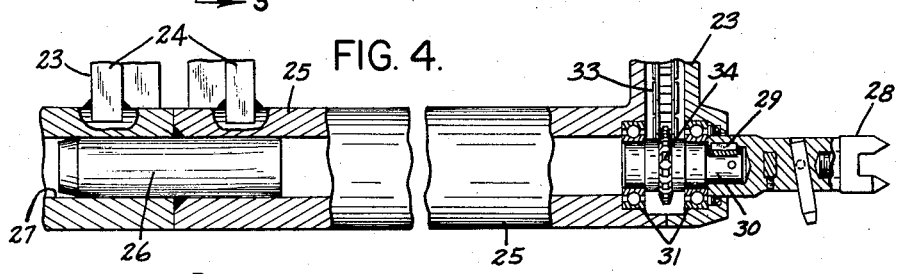
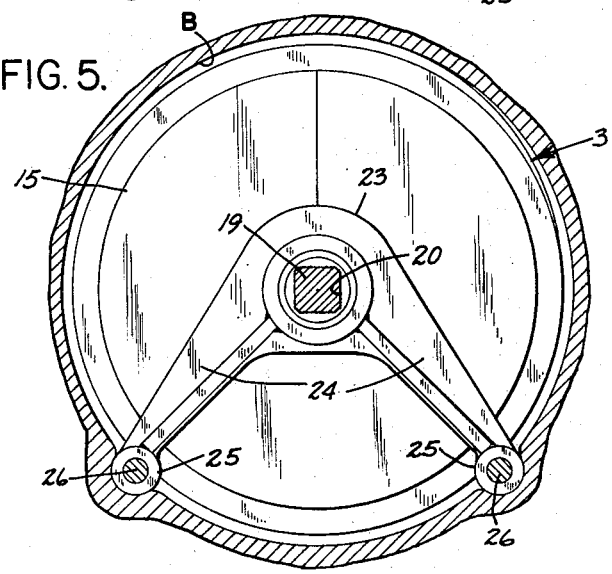
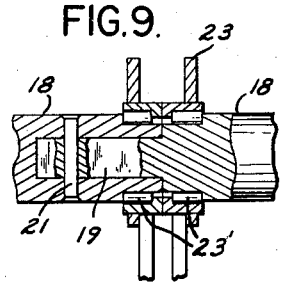
INVENTOR:
NEAL W. DENSMORE

Aug. 9, 1960 N. W. DENSMORE 2,948,520
AUGER BORING MACHINE FOR MINING COAL
Filed Sept. 7, 1955 3 Sheets-Sheet 3
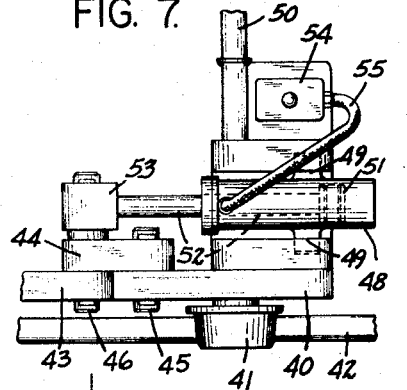
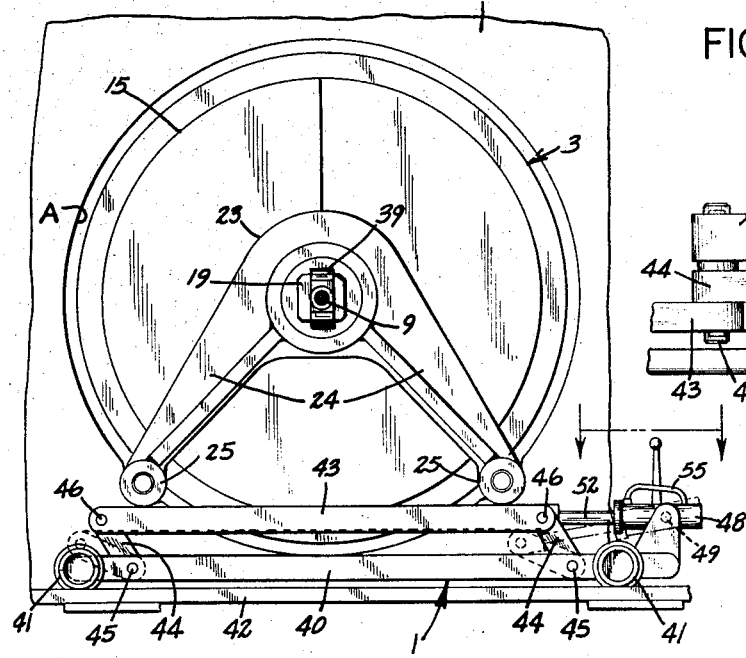
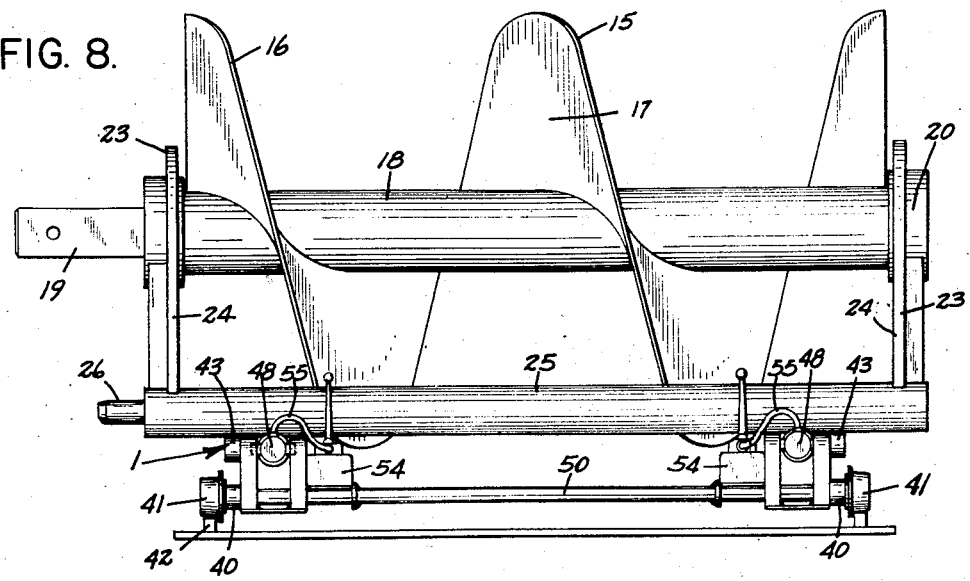
INVENTOR:
NEAL W. DENSMORE
BY
Charles F. Osgood,
ATTORNEY

United States Patent Office 2,948,520
Patented Aug. 9, 1960

2,948,520

AUGER BORING MACHINE FOR MINING COAL

Neal W. Densmore, Franklin, Pa., assignor to Joy Manufacturing Company, Pittsburgh, Pa., a corporation of Pennsylvania Filed Sept. 7, 1955, Ser. No. 532,873

12 Claims. (Cl. 262—26)

This invention relates to a boring head type mining machine having an auger drill string composed of a series of detachable auger sections and more particularly to improved means for transfering auger sections from a storage hole to the boring machine together with means for supporting and guiding the auger string within the hole being drilled.

In drills of the coal recovery type or in large auger drills for mining coal in underground mines a series of parallel horizontal holes are drilled in the coal seam by means of an auger boring head and the boring head is usually attached to an auger string attached to the chuck of the boring machine. Such an auger drill string is usually made up of a series of aligned auger sections suitably detachably coupled together and after a hole is drilled the boring machine may be moved laterally to a new drilling position and a parallel hole may be started by another boring head attached to the machine chuck. The series of aligned auger sections are usually stored in the completed hole and, as the adjacent parallel hole deepens, the auger sections are detached from the stored drill string and transferred to the auger string of the boring machine. Such auger drill sections are relatively heavy and unwieldy and ofttimes the sections are manually rolled over the floor during transfer and the auger sections are manually lifted and positioned in alignment with the chuck of the machine. The auger sections usually have spiral vanes or flights for conveying the cuttings from the bore-hole and as the sections are rolled over the floor during transfer and are fed into the hole during the drilling operation they are guided by the spiral vanes at the drill periphery, and in order to reduce wear the outer edges of such vanes are usually hard faced. The present invention contemplates improvements over such known types of auger boring machines in that a transfer carriage is provided for transferring the auger sections from storage to their point of use and for elevating and positioning the auger sections for attachment to the chuck of the boring machine. Also improved means is provided for guiding the auger drill string within the hole being drilled to eliminate abrasive contact of the outer edges of the auger flights with the walls of the bore-hole thus to reduce the power consumed in the driving of the auger. Thus the need for hard facing the outer edges of the spiral vanes of the auger sections to reduce wear has been eliminated and transfer and positioning of the auger sections is made relatively easy.

An object of the present invention is to provide improved supporting and guiding means for an auger drill string of a boring machine whereby friction at the exterior edges of the spiral vanes or flights of the auger sections is reduced to a minimum, thereby reducing the power consumed in the rotation of the auger string during the drilling operation. Another object is to provide transfer means for transferring auger sections from a storage-hole to the boring machine for attachment to the machine-chuck. A further object is to provide improved supporting and adjusting mechanism for the sections of an auger drill string whereby the auger sections may be easily transferred, elevated and positioned. A still further object is to provide improved means for guiding an auger drill string within the hole being drilled, thereby to reduce friction by substantially eliminating abrasive contact of the outer edges of the auger flights with the walls of the drill-hole thus to reduce the power requirements and the need for hard surfacing the outer edges of the auger flights. These and other objects and advantages of the invention will hereinafter more fully appear in the course of the ensuing description.

In the accompanying drawings there is shown for purposes of illustration one form which the invention may assume in practice.

In these drawings:

Fig. 2 shows an enlarged fragmentary vertical section taken through a bore-hole, with a portion of the boring and drilling head in side elevation.

Fig. 3 is a cross section taken on line 3—3 of Fig. 2.

Fig. 4 is an enlarged longitudinal section taken on line 4—4 of Fig. 3, showing one of the small drilling cutters associated with the boring head.

Fig. 5 is an enlarged cross section taken on line 5—5 of Fig. 1, showing one of the guide frames for guiding the auger string within the bore-hole.

Fig. 6 is a cross section taken on line 6—6 of Fig. 1, showing the transfer carriage for the stored auger sections, with an auger section in position thereon.

Fig. 7 is an enlarged fragmentary plan view of the transfer carriage, looking in the direction of the arrows in Fig. 6 and showing one of the pumps and elevating jacks.

Fig. 8 is a side view of the transfer carriage shown in Fig. 6.

Fig. 9 is an enlarged vertical section taken on line 9—9 of Fig. 1, showing the detachable coupling and bearing support between adjacent auger sections.

Figure 1:
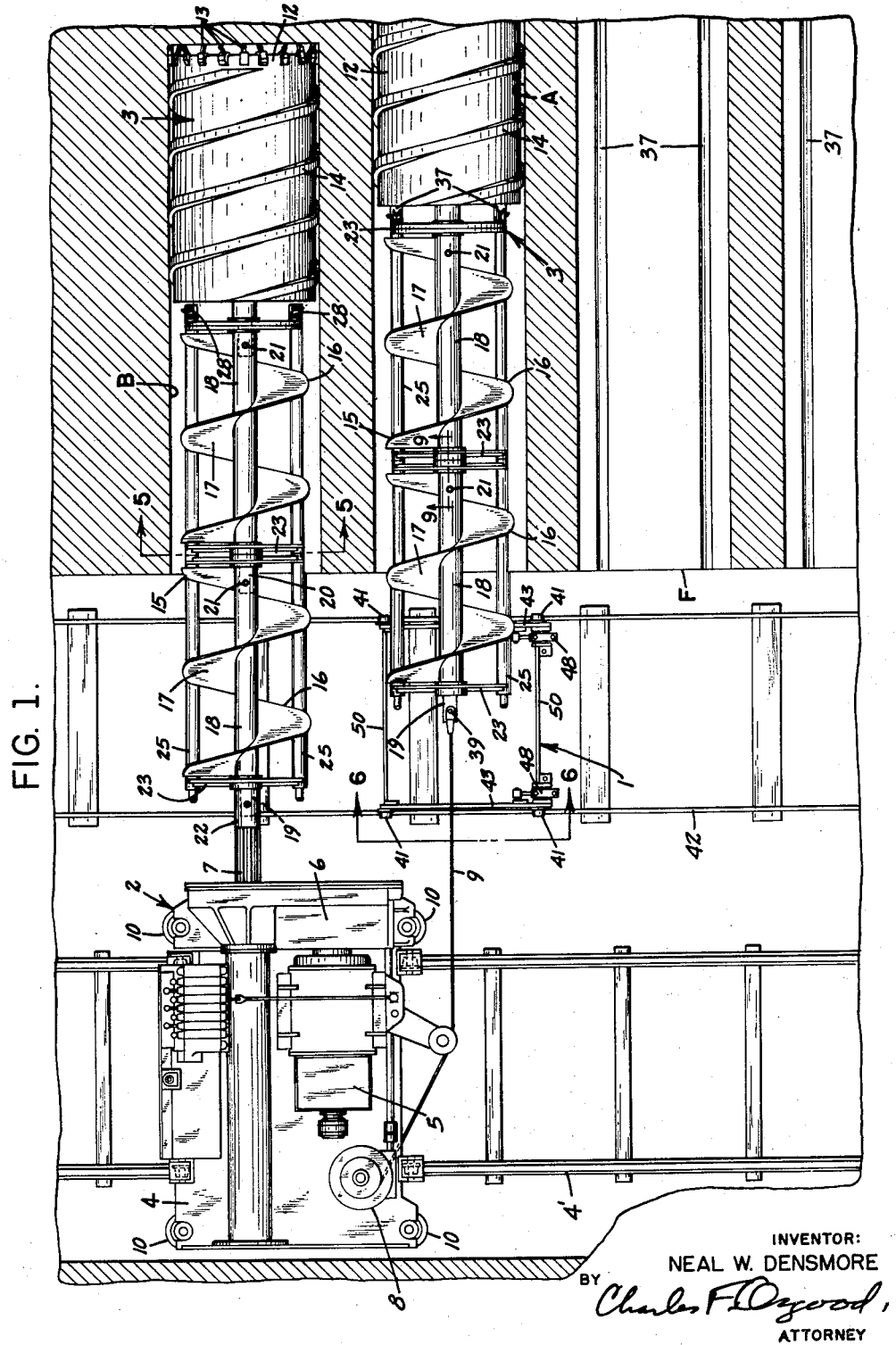
Fig. 1 is a somewhat diagrammatic plan view showing the improved auger transfer means and the supporting and guiding means for the auger string in association with an auger boring machine, with the parts in operating position at the working face of an underground mine.

In this illustrative embodiment of the invention, as shown in the drawings, the improved auger transfer means is generally designated 1 and the associated auger boring machine, generally designated 2, is especially designed for mining coal during either recovery work or underground mining and has an improved boring head mechanism, generally designated 3, in association therewith. Evidently, the transfer mechanism and the boring head mechanism may be used with machines of other types for other purposes.

The auger boring machine 2 may assume various forms, but herein, for illustrative purposes, may be generally similar to that disclosed in a copending Goodrich and Hale application Serial No. 96,387, filed May 24, 1949, owned by the assignee of the present invention, now Patent No. 2,726,064.

As shown in Fig. 1, the boring machine 2 generally comprises a wheel-supported frame 4 adapted to travel along a trackway 4' laid on the mine floor near the side of the mine passageway remote from the working face F in parallelism with the latter and carried by this frame is a motor 5 for driving a conventional rotating mechanism 6 for a drill spindle 7. Also mounted on the machine frame is a winch 8 having a cable 9 wound thereon. Arranged at the four corners of the machine frame are conventional power jack devices 10 for adjusting the frame and to provide for stability during the drilling operation. Since this boring machine does not per se enter into the present invention further description thereof is herein unnecessary other than to state that the boring head mechanism 3 may be guided, positioned and rotated, all in a well-known manner.

The boring head mechanism 3 comprises a cylindrical boring cutter or cutter ring 12 having an annular series of cutting elements 13 and formed exteriorly on the cylindrical cutter are auger flights or spiral vanes 14 for conveying the cuttings from the face of the hole being drilled. The auger boring head is carried by an auger string 15 composed of a series of auger sections 16 having spiral flights or vanes 17. These auger sections have shaftlike bodies 18 each having a shank portion 19 at one end and a socketed portion 20 at the other end, and the shank portions are secured within the socketed portions by releasable connecting elements 21. The outermost auger section has its shank portion 19 received within a socketed portion or chuck 22 on the drill spindle 7. Arranged at the ends of the auger sections are supporting and guiding frames 23 carrying anti-friction bearings 23' of which the auger sections are journaled (Fig. 9) and having supporting arms or leglike supports 24 arranged as shown in Figs. 3, 5 and 6. Formed integral with the lower portions of the arms 24 are parallel longitudinally extending tubular elements or cylindrical guides 25, and these tubular elements or guides of the different auger sections are maintained in end to end alignment by means of dowel pins 26 received within bores 27 (Fig. 4). Journaled at the forward ends of the outermost tubular elements 25 are small rotary cutters or drill bits 28 keyed at 29 to shafts 30 journaled within bearings 31. Driven by the shaftlike bodies 18 of the auger sections is a sprocket 32 for driving an endless chain 33 which passes around sprockets 34 secured to the drill shafts 30. The drive chain is enclosed within the front support 23 which is herein made hollow, and guide sprockets 35 are provided for guiding the portion of the drive chain intermediate the sprockets 34, as shown in Fig. 3. Thus as the boring head is driven by the spindle 7 of the boring machine the small cutters or drill bits 28 are concurrently driven to drill shallow grooves 37 along the lower wall of the bore-hole to provide guiding grooves for receiving the tubular shoelike portions or guides 25 of the auger string supports. These tubular guides are desirably in the form of sliding shoes and have sliding guided engagement with the guiding grooves at the bore wall. Thus as the boring head mechanism is advanced during the boring and drilling operation the tubular portions or guides 25 of the guide frames slide within the grooves 37 to provide for proper guiding of the auger string and for maintaining the guide frames against bodily rotation about the axis of rotation of the boring head. Thus the boring head is supported and guided independently of the outer edges of the auger flights thereby reducing power consumption and eliminating the need for hard facing of the outer edges of the flights.

When the bore-hole A is completed, the boring machine may be moved along the trackway 4' parallel to the work face to a new drilling position and another boring head and drilling head mechanism 3 may be attached to the drill spindle 7 to form a parallel bore-hole B. The auger sections of the auger string are stored within the bore-hole A during starting of the parallel hole and auger sections are detached from the stored auger string and transferred parallel to the work face, as to be now described, for connection to the other auger string as the bore-hole B deepens. The cable 9 of the machine-winch 8 may be suitably attached at 39 to the inner end of the auger string and the detached auger section may be withdrawn axially from the storage-hole and suitably positioned on the transfer means 1 in the manner shown in Fig. 1. The winch cable may then be detached from the auger section received on the transfer means and the transfer means may be moved parallel to the work face.

Now referring to the specific structure of the transfer means 1, it will be noted that a frame 40 is mounted on guides, such as on small wheels or rollers 41, adapted to travel along a trackway 42 laid on the mine floor in parallelism and adjacency to the working face F intermediate the face and the trackway 4' for the boring machine 2, as shown in Fig. 1. Superimposed on the frame 40 of the wheeled carriage are independently adjustable work supports 43 on which the tubular portions 25 of the auger guide frame 23 are adapted to rest, as shown in Figs. 6 and 8. These work supports 43 extend longitudinally in parallelism with the sides of the carriage frame and are supported by parallel levers or cranks 44, these levers or cranks being pivotally connected at 45 to the carriage frame and pivotally connected at 46 to the ends of the work supports 43. Thus parallel motion levers or cranks are provided for each of the load supports 43 and means are provided for independently swinging the levers or cranks so that the work supports may be independently raised or lowered as desired. The raising and lowering devices each comprises fluid cylinders 48 having trunnions pivotally mounted at 49 on a transverse portion 50 of the carriage frame and reciprocable within each of the cylinders is a piston 51 having its piston rod 52 pivotally connected at 53 to the adjacent lever of crank 44 of the parallel motion means. Mounted on the carriage frame at the opposite sides thereof are conventional hand pumps 54 for supplying fluid under pressure through conduits 55 to the cylinders 48. Thus by independently operating the hand pumps the work supports 43 at the opposite sides of the transfer carriage may be independently raised and lowered thereby to facilitate positioning of the auger sections with respect to the chuck of the drill spindle. It will thus be seen that by the provision of the transfer carriage the auger sections may be easily and quickly moved from their stored positions to their points of use.

As a result of this invention an improved auger boring machine, especially designed for use in the recovery or the mining of coal, is provided having improved means for transferring, guiding and positioning the auger sections during transfer thereof from the storage hole to the auger string of the boring machine. By the provision of the improved guides for the auger string the boring head may be guided in the bore-hole independently of the auger flights so that power consumption, by eliminating the abrasive action of the outer edges of the flights with the walls of the bore-hole, is substantially reduced. Also by the provision of the improved guiding means for the auger string and the improved transfer means, wear of the outer edges of the auger flights is substantially reduced and the need for hard facing of the outer edges of the flights is avoided. By the provision of the small drilling cutters associated with the boring head guiding grooves are formed in the walls of the bore-hole for receiving and guiding the supports for the auger string, thereby to improve the supporting and guiding of the boring head. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an auger boring machine, a rotary boring head for forming a bore-hole, drilling cutters driven concurrently with said boring head rotating about axes parallel with the axis of head rotation for forming parallel grooves along the walls of the bore-hole as drilling progresses, and supporting and guiding means for said boring head for guiding the latter within the bore-hole including guiding elements received in and movable along said parallel grooves, said drilling cutters carried at the front ends of said guiding elements respectively.

2. In an auger boring machine, an auger string composed of a series of detachably connected aligned auger sections, a boring head for forming a hole in the material being drilled for receiving said auger string as drilling progresses, supporting and guiding means for said auger string comprising supporting and guiding elements one for each auger section movable into the bore-hole in engagement with the hole-walls and having bearing portions arranged intermediate the aligned auger sections whereby the latter may be separately supported by a supporting and guiding element when detached from one another, means for forming contiguous guide kerfs extending from said hole formed by said boring head to receive said auger string supporting and guiding means, said guide kerfs supporting said supporting and guiding means so that said auger string is positioned for rotation within the formed hole without contacting the periphery of said formed hole, and means for detachably coupling said supporting and guiding means together in end-to-end relation.

3. In combination, a boring machine for driving a drill string composed of aligned sections and carrying a boring head, said drill string movable with the boring machine into parallel boring positions along a path extending in parallelism with the face of the work being drilled, and transfer means for receiving, supporting and moving stored sections of a drill string to positions for attachment to the drill string of the machine to increase the effective length of the drill string as boring progresses, said transfer means arranged near the working face and movable along a path extending in parallelism with the face between the latter and the path of lateral movement of said boring machine.

4. A combination as set forth in claim 3 wherein said boring machine and said transfer means are respectively guided for movement along trackways laid in parallelism on the floor with the trackways for the boring machine disposed relatively remote from the working face.

5. In combination, a boring machine guided for lateral movement along a path parallel with and spaced from a face to be drilled, said boring machine having a sectional drill string carrying a boring head, and means movable in parallelism with the working face in the space between the working face and the boring machine for receiving and supporting additional auger sections for transfer from a place of storage to positions for attachment to the drill string of the machine to increase the effective length of the drill string as the bore-hole deepens.

6. A combination as set forth in claim 5 wherein said receiving, supporting and transfer means is adapted to support an auger section and has adjusting means for elevating and positioning the auger section supported thereby.

7. In an auger boring machine adapted to bore adjacent parallel holes in a mineral vein comprising; an auger spindle driving mechanism mounted for movement along a path transverse to said parallel holes, means mounted on said driving mechanism for extracting auger string sections from a completed hole to transfer means, said transfer means positioned intermediate said driving mechanism and said mineral vein for transferring an extracted auger string section between adjacent holes, positioning means associated with said transfer means for aligning said extracted auger sections with the hole being bored.

8. In an auger boring machine adapted to bore adjacent parallel holes in a mineral vein comprising; an auger spindle driving mechanism mounted for movement along a path transverse to said parallel holes, means mounted on said driving mechanism for extracting auger string sections from a completed hole to transfer means, said transfer means positioned intermediate said driving mechanism and said mineral vein for transferring an extracted auger string section between adjacent holes, positioning means associated with said transfer means for aligning said extracted auger sections with the hole being bored, said positioning means comprises a pair of spaced adjustable supporting means for supporting said extracted auger sections and means for independently moving each said supporting means in an adjusted position.

9. In an auger boring machine, a rotary auger comprising a series of aligned auger sections detachably coupled together, supporting means for supporting each of said auger sections independently of each other when uncoupled, a bearing housing at either end of said auger section having integral arms which are secured to said supporting means, said supporting means being coupled and uncoupled similarly to and simultaneous with said auger sections so that coupling of the auger sections also couples said supporting means.

10. In an auger boring machine, an auger string composed of a series of detachably connected aligned auger sections and carrying a boring head for forming a hole in the material being drilled for receiving the auger string as drilling progresses, supporting and guiding means for said auger string comprising supporting and guiding elements one for each auger section movable into the bore-hole in engagement with the hole-walls and having bearing portions arranged intermediate the aligned auger sections whereby the latter may be separately supported by a supporting and guiding element when detached from one another, and means for detachably coupling said supporting and guiding elements together in end-to-end relation wherein drilling means is supported by the forward one of said supporting and guiding elements for forming a groove longitudinally of the bore-hole along a wall thereof for receiving a portion of said supporting and guiding means and along in which said portion slides as said boring head and the auger string are advanced during the boring operation.

11. In an auger boring machine, a horizontal rotary auger comprising a series of aligned auger sections detachably coupled together, supporting means for each auger section for supporting the latter on a supporting surface independently of the exterior periphery of the auger section and each having a bearing mounting on which the auger section is journaled, each supporting means having bottom supports engaging the supporting surface and extending substantially coextensive with each auger section and along which supports said supporting means may slide over the supporting surface either when said supporting means are separate or coupled together, and means for detachably coupling said supporting means together in end-to-end relation wherein a boring head effects boring of a hole and the front auger section carries drills rotating about axes parallel with the axis of rotation of said boring head and respectively aligned with said bottom supports of the front supporting means for forming parallel grooves along the walls of the bore-hole, said bottom supports being slidably received and guided in said grooves.

12. In an auger boring machine, a horizontal rotary auger comprising a series of aligned auger sections detachably coupled together, supporting means for each auger section for supporting the latter on a supporting surface independently of the exterior periphery of the auger section and each having a bearing mounting on which the auger section is journaled, each supporting means having bottom supports engaging the supporting surface and extending substantially coextensive with each auger section and along which supports said supporting means may slide over the supporting surface either when said supporting means are separate or coupled together, means for detachably coupling said supporting means together in end-to-end relation, and a transversely disposed transfer mechanism which receives an auger section and is provided with supporting means on which said parallel supports rest and move laterally during transfer.

References Cited in the file of this patent

UNITED STATES PATENTS

| | | |
|---|---|---|
| 635,304 | Culver | Oct. 24, 1899 |
| 1,674,870 | Morgan | June 26, 1928 |
| 1,757,772 | Johnson | May 6, 1930 |
| 2,059,703 | McBane | Nov. 3, 1936 |
| 2,608,313 | Wilson | Aug. 26, 1952 |
| 2,616,677 | Compton | Nov. 4, 1952 |
| 2,698,169 | Fawkes | Dec. 28, 1954 |
| 2,715,526 | Letts | Aug. 16, 1955 |
| 2,726,064 | Goodrich et al. | Dec. 6, 1955 |
| 2,727,637 | Weaver | Dec. 20, 1955 |
| 2,751,203 | Compton | June 19, 1956 |
| 2,756,037 | Kirkpatrick | July 24, 1956 |

FOREIGN PATENTS

| | | |
|---|---|---|
| 698,978 | Great Britain | Oct. 28, 1953 |

OTHER REFERENCES

"Coal Mine Modernization," pp. 306 and 308, 1951.
"Coal Age," pp. 76 and 77, December 1948.
"Coal Mine Modernization," p. 362, 1954.